May 1, 1945. H. L. BONE ET AL 2,374,728
GENERATOR
Original Filed Jan. 4, 1941

INVENTORS
Herbert L. Bone and
BY John W. Livingston
THEIR ATTORNEY

Patented May 1, 1945

2,374,728

UNITED STATES PATENT OFFICE 2,374,728

GENERATOR

Herbert L. Bone, Forest Hills, Pa., and John W. Livingston, Milwaukee, Wis., assignors to The Union Switch and Signal Company, Swissvale, Pa., a corporation of Pennsylvania Original application January 4, 1941, Serial No. 373,132, now Patent No. 2,313,916, dated March 16, 1943. Divided and this application November 11, 1942, Serial No. 465,186

3 Claims. (Cl. 171—209)

Our invention relates to generators, and particularly to generators which are intended to be mounted on the journal boxes, and driven from the axles, of cars or locomotives which are in high speed service for indicating or controlling the speed of the cars or locomotives, for controlling the braking ratio, or the like.

One object of our invention is to provide an improved permanent magnet field assembly for a generator of the type described which assembly is sufficiently rugged to stand up under the severe operating conditions to which the generator is subjected, and which can be manufactured at a minimum cost.

According to our invention, the field assembly of the generator comprises a pair of permanent magnets clamped between pole pieces by means of socket head cap screws of non-magnetic material. The bore in the generator housing and outside diameter of the field assembly are accurately machined so that the field assembly will have a light press fit with the housing. This fit, while sufficiently snug to hold the assembly in place, is not tight enough to set up undesirable stresses in the permanent magnets. The field assembly is clamped between the body and one end bell of the generator housing by means of suitable bolts passing through clearance holes in the pole pieces and threaded into tapped holes in the body casting.

Other objects and characteristic features of our invention will become apparent as the description proceeds.

The present invention is a division of our copending application, Serial No. 373,132, filed on January 4, 1941, now Patent No. 2,313,916 of Mar. 16, 1943, for Generator and mounting means therefor.

We shall describe one form of generator embodying our invention, and shall then point out the novel features thereof in claims.

Figure 1:
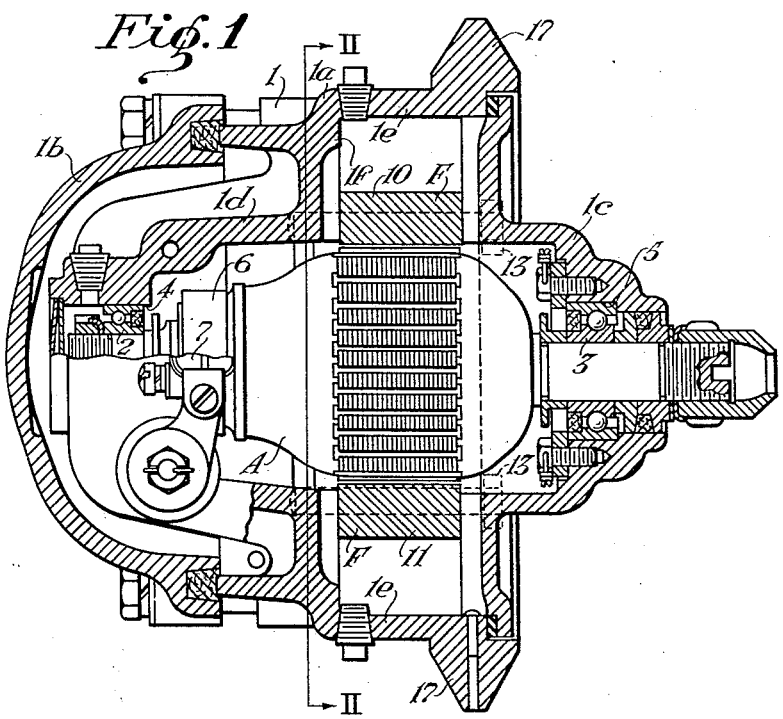
Figure 2:
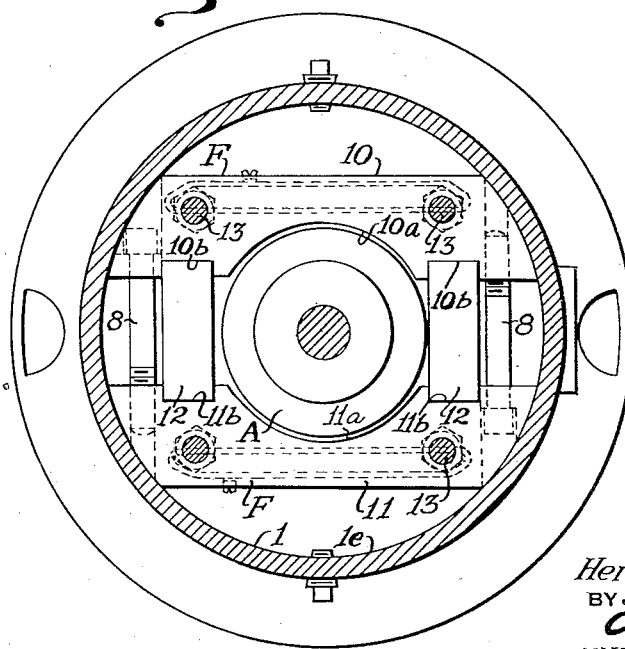

In the accompanying drawing, Fig. 1 is a vertical sectional view showing a generator provided with a field assembly constructed in accordance with our invention. Fig. 2 is a sectional view taken substantially on the line II—II of Fig. 1.

Similar reference characters refer to similar parts in both views.

Referring to the drawing, a generator embodying our invention comprises, as usual, an armature A and a field assembly F disposed within a suitable housing 1. This housing as shown consists of a main body portion 1a provided at one end with an end cap 1b and at the other end with an end bell 1c.

The armature A is of conventional construction, and is rotatably mounted in suitable anti-friction bearings 2 and 3 secured within bearing openings 4 and 5 formed respectively in a bearing and brush support 1d provided on the main body portion 1a and in an end bell 1c. The armature commutator 6 is disposed within the support 1d and cooperates with brushes not shown mounted in brush holders 7 secured to the support. The construction of the brushes and brush holders forms no part of our present invention, and hence need not be specifically described.

The field assembly of the generator, which field assembly embodies our invention, consists of magnetizable pole pieces 10 and 11, preferably of cold rolled steel, and permanent magnets 12 which are clamped between the pole pieces on opposite sides of the armature by means of two socket head cap screws 8 of non-magnetic material. The pole pieces are provided with curved pole faces 10a and 11a for cooperation with the armature, and with recesses 10b and 11b which receive the ends of the magnets to retain them in the proper positions and to provide a good magnetic connection between the permanent magnets and the pole pieces. It will be noted that the permanent magnets are in the form of rectangular bars which eliminates any necessity for machining the magnets, whereby the cost of construction of the field assembly is reduced to a minimum.

The field assembly is disposed within a bore 1e formed in the main body portion 1a of the housing 1, and this bore and the cooperating outer surfaces of the pole pieces are accurately machined to provide a press fit between the field assembly and the housing. This fit, while sufficiently tight to snugly hold the field assembly in place, is not tight enough to set up undesirable stresses in the magnets.

The field assembly in addition to being held in place by a press fit between it and the housing is clamped between a shoulder 1f formed in the body at the inner end of the bore 1e and the end bell 1c by means of four bolts 13 which pass through clearance holes in the end bell and the pole pieces and are screwed into tapped holes provided in the body casting. It will be observed that the bolts 13 comprise the means for securing the end bell 1c to the main body portion of the housing.

It should be pointed out that while a field assembly embodying our invention has been described in connection with a generator, it could equally well be used in a motor, as is obvious.

Although we have herein shown and described only one form of generator embodying our invention, it is understood that various changes and modifications may be made therein within the scope of the appended claims without departing from the spirit and scope of our invention.

Having thus described our invention, what we claim is:

1. A field assembly for a generator or motor having a housing provided with a bore for the reception of the assembly, said assembly comprising a pair of pole pieces each provided with a pole face and with a recess disposed on each side of said pole face, a pair of straight magnets clamped between said pole pieces with their ends disposed in said recesses, said pole pieces in their assembled positions having their outer surfaces accurately machined to fit into the bore of said housing with a press fit which is sufficiently tight to snugly hold the field assembly in place but not tight enough to set up undesirable stresses in the magnets.

2. A field assembly for a generator or motor having a housing provided with a bore for the reception of the assembly, said assembly comprising a pair of pole pieces each provided with a pole face and with a recess disposed on each side of said pole face, a pair of straight magnets clamped between said pole pieces with their ends disposed in said recesses, said pole pieces in their assembled positions having their outer surfaces accurately machined to fit into the bore of said housing with a press fit which is sufficiently tight to snugly hold the field assembly in place but not tight enough to set up undesirable stresses in the magnets, and bolts passing through clearance holes provided in the pole pieces and screwed into tapped holes provided in the housing.

3. A field assembly for a generator or motor having a housing provided with a bore for the reception of the assembly, said assembly comprising a pair of pole pieces each provided with a pole face and with a recess disposed on each side of said pole face, a pair of straight magnets clamped between said pole pieces with their ends disposed in said recesses, said pole pieces in their assembled positions having their outer surfaces accurately machined to fit into the bore of said housing with a press fit which is sufficiently tight to snugly hold the field assembly in place but not tight enough to set up undesirable stresses in the magnets, a shoulder disposed at the inner end of said bore and engaging the inner sides of said pole pieces, an end bell for the generator or motor engaging the outer side of said pole pieces, and bolts passing through clearance holes provided in said end bell and said pole pieces and screwed into tapped holes provided in the housing, said bolts serving both as a means for securing said end bell in place and also as a means for clamping said field assembly between said shoulder and said end bell.

HERBERT L. BONE.
JOHN W. LIVINGSTON.